(12) United States Patent
Sobel et al.

(10) Patent No.: US 7,565,686 B1
(45) Date of Patent: Jul. 21, 2009

(54) PREVENTING UNAUTHORIZED LOADING OF LATE BINDING CODE INTO A PROCESS

(75) Inventors: William E. Sobel, Stevenson Ranch, CA (US); Mark Kennedy, Redondo Beach, CA (US)

(73) Assignee: Symantec Corporation, Cupertino, CA (US)

( * ) Notice: Subject to any disclaimer, the term of this patent is extended or adjusted under 35 U.S.C. 154(b) by 830 days.

(21) Appl. No.: 10/983,374

(22) Filed: Nov. 8, 2004

(51) Int. Cl.
*G06F 11/30* (2006.01)
*G06F 12/14* (2006.01)
*H04L 12/22* (2006.01)

(52) U.S. Cl. .............................. 726/2; 726/22; 726/23; 726/24; 726/25; 726/26; 726/30; 713/164; 713/165; 713/188; 714/799

(58) Field of Classification Search ................. 726/2
See application file for complete search history.

(56) References Cited

U.S. PATENT DOCUMENTS

| | | |
|---|---|---|
| 5,398,196 A | 3/1995 | Chambers |
| 5,440,723 A | 8/1995 | Arnold et al. |
| 5,452,442 A | 9/1995 | Kephart |
| 5,473,769 A | 12/1995 | Cozza |
| 5,495,607 A | 2/1996 | Pisello et al. |
| 5,572,590 A | 11/1996 | Chess |
| 5,675,710 A | 10/1997 | Lewis |
| 5,694,569 A | 12/1997 | Fischer |
| 5,696,822 A | 12/1997 | Nachenberg |
| 5,715,174 A | 2/1998 | Cotichini et al. |
| 5,715,464 A | 2/1998 | Crump et al. |
| 5,758,359 A | 5/1998 | Saxon |
| 5,812,763 A | 9/1998 | Teng |
| 5,826,249 A | 10/1998 | Skeirik |
| 5,832,208 A | 11/1998 | Chen et al. |
| 5,832,527 A | 11/1998 | Kawaguchi |

(Continued)

FOREIGN PATENT DOCUMENTS

DE   100 21 686 A1   11/2001

(Continued)

OTHER PUBLICATIONS

Klinkoff, P., 'Extending .NET Security to Native Code', Vienna Univ. of Technology, 2005, entire document, http://www.seclab.tuwien.ac.at/people/pk/thesis.pdf.*

(Continued)

*Primary Examiner*—Kambiz Zand
*Assistant Examiner*—Ronald Baum
(74) *Attorney, Agent, or Firm*—Fenwick & West LLP

(57) ABSTRACT

A late binding code manager prevents the unauthorized loading of late binding code into a process. The late binding code manager detects an attempt to load late binding code into a process's address space. Subsequently, the late binding code manager determines whether a detected attempt to load late binding code into a process's address space is permitted. Responsive to the results of a determination as to whether an attempt to load late binding code into a process's address space is permitted, the late binding code manager executes at least one additional step affecting the loading of the late binding code into the process's address space. Such a step can comprise permitting, blocking or modifying the attempt to load the late binding code.

18 Claims, 3 Drawing Sheets

U.S. PATENT DOCUMENTS

| | | | |
|---|---|---|---|
| 5,854,916 | A | 12/1998 | Nachenberg |
| 5,884,033 | A | 3/1999 | Duvall et al. |
| 5,889,943 | A | 3/1999 | Ji et al. |
| 5,944,821 | A | 8/1999 | Angelo |
| 5,951,698 | A | 9/1999 | Chen et al. |
| 5,956,481 | A | 9/1999 | Walsh et al. |
| 5,960,170 | A | 9/1999 | Chen et al. |
| 5,974,549 | A | 10/1999 | Golan |
| 5,978,917 | A | 11/1999 | Chi |
| 5,987,610 | A | 11/1999 | Franczek et al. |
| 6,006,242 | A | 12/1999 | Poole et al. |
| 6,021,510 | A | 2/2000 | Nachenberg |
| 6,023,723 | A | 2/2000 | McCormick et al. |
| 6,052,709 | A | 4/2000 | Paul |
| 6,070,244 | A | 5/2000 | Orchier et al. |
| 6,072,830 | A | 6/2000 | Proctor et al. |
| 6,072,942 | A | 6/2000 | Stockwell et al. |
| 6,088,803 | A | 7/2000 | Tso et al. |
| 6,092,194 | A | 7/2000 | Touboul |
| 6,094,731 | A | 7/2000 | Waldin et al. |
| 6,104,872 | A | 8/2000 | Kubota et al. |
| 6,108,799 | A | 8/2000 | Boulay et al. |
| 6,125,459 | A | 9/2000 | Andoh et al. |
| 6,161,130 | A | 12/2000 | Horvitz et al. |
| 6,167,434 | A | 12/2000 | Pang |
| 6,192,379 | B1 | 2/2001 | Bekenn |
| 6,199,181 | B1 | 3/2001 | Rechef et al. |
| 6,253,169 | B1 | 6/2001 | Apte et al. |
| 6,275,938 | B1 | 8/2001 | Bond et al. |
| 6,298,351 | B1 | 10/2001 | Castelli et al. |
| 6,338,141 | B1 | 1/2002 | Wells |
| 6,347,310 | B1 | 2/2002 | Passera |
| 6,357,008 | B1 | 3/2002 | Nachenberg |
| 6,370,526 | B1 | 4/2002 | Agrawal et al. |
| 6,370,648 | B1 | 4/2002 | Diep |
| 6,397,200 | B1 | 5/2002 | Lynch et al. |
| 6,397,215 | B1 | 5/2002 | Kreulen et al. |
| 6,401,122 | B1 | 6/2002 | Matsui et al. |
| 6,421,709 | B1 | 7/2002 | McCormick et al. |
| 6,424,960 | B1 | 7/2002 | Lee et al. |
| 6,442,606 | B1 | 8/2002 | Subbaroyan et al. |
| 6,456,991 | B1 | 9/2002 | Srinivasa et al. |
| 6,493,007 | B1 | 12/2002 | Pang |
| 6,502,082 | B1 | 12/2002 | Toyama et al. |
| 6,505,167 | B1 | 1/2003 | Horvitz et al. |
| 6,535,891 | B1 | 3/2003 | Fisher et al. |
| 6,546,416 | B1 | 4/2003 | Kirsch |
| 6,552,814 | B2 | 4/2003 | Okimoto et al. |
| 6,611,925 | B1 | 8/2003 | Spear |
| 6,622,150 | B1 | 9/2003 | Kouznetsov et al. |
| 6,678,734 | B1 | 1/2004 | Haatainen et al. |
| 6,681,266 | B2 * | 1/2004 | Ayyagari .................... 719/331 |
| 6,697,950 | B1 | 2/2004 | Ko |
| 6,721,721 | B1 | 4/2004 | Bates et al. |
| 6,748,534 | B1 | 6/2004 | Gryaznov et al. |
| 6,751,789 | B1 | 6/2004 | Berry et al. |
| 6,763,462 | B1 | 7/2004 | Marsh |
| 6,772,346 | B1 | 8/2004 | Chess et al. |
| 6,813,712 | B1 | 11/2004 | Luke |
| 6,842,861 | B1 | 1/2005 | Cox et al. |
| 6,851,057 | B1 | 2/2005 | Nachenberg |
| 6,886,099 | B1 | 4/2005 | Smithson et al. |
| 6,910,134 | B1 | 6/2005 | Maher et al. |
| 6,944,555 | B2 | 9/2005 | Blackett et al. |
| 6,952,779 | B1 | 10/2005 | Cohen et al. |
| 6,973,578 | B1 | 12/2005 | McIchionc |
| 7,024,403 | B2 | 4/2006 | Kyler |
| 2002/0004908 | A1 | 1/2002 | Galea |
| 2002/0035693 | A1 | 3/2002 | Eyres et al. |
| 2002/0035696 | A1 | 3/2002 | Thacker |
| 2002/0038308 | A1 | 3/2002 | Cappi |
| 2002/0046207 | A1 | 4/2002 | Chino et al. |
| 2002/0046275 | A1 | 4/2002 | Crosbie et al. |
| 2002/0073046 | A1 | 6/2002 | David |
| 2002/0083175 | A1 | 6/2002 | Afek et al. |
| 2002/0087649 | A1 | 7/2002 | Horvitz |
| 2002/0091940 | A1 | 7/2002 | Wellborn et al. |
| 2002/0138525 | A1 | 9/2002 | Karadimitriou et al. |
| 2002/0147694 | A1 | 10/2002 | Dempsey et al. |
| 2002/0147782 | A1 | 10/2002 | Dimitrova et al. |
| 2002/0157008 | A1 | 10/2002 | Radatti |
| 2002/0162015 | A1 | 10/2002 | Tang |
| 2002/0178374 | A1 | 11/2002 | Swimmer et al. |
| 2002/0178375 | A1 | 11/2002 | Whittaker et al. |
| 2002/0194488 | A1 | 12/2002 | Cormack et al. |
| 2002/0194489 | A1 | 12/2002 | Almogy et al. |
| 2002/0199186 | A1 | 12/2002 | Ali et al. |
| 2002/0199194 | A1 | 12/2002 | Ali |
| 2003/0023865 | A1 | 1/2003 | Cowie et al. |
| 2003/0023875 | A1 | 1/2003 | Hursey et al. |
| 2003/0033587 | A1 | 2/2003 | Ferguson et al. |
| 2003/0051026 | A1 | 3/2003 | Carter et al. |
| 2003/0061287 | A1 | 3/2003 | Yu et al. |
| 2003/0065926 | A1 | 4/2003 | Schultz et al. |
| 2003/0110280 | A1 | 6/2003 | Hinchliffe et al. |
| 2003/0110393 | A1 | 6/2003 | Brock et al. |
| 2003/0110395 | A1 | 6/2003 | Presotto et al. |
| 2003/0115458 | A1 | 6/2003 | Song |
| 2003/0115479 | A1 | 6/2003 | Edwards et al. |
| 2003/0115485 | A1 | 6/2003 | Milliken |
| 2003/0120951 | A1 | 6/2003 | Gartside et al. |
| 2003/0126449 | A1 | 7/2003 | Kelly et al. |
| 2003/0131347 | A1 * | 7/2003 | Allison ..................... 717/165 |
| 2003/0140049 | A1 | 7/2003 | Radatti |
| 2003/0154394 | A1 | 8/2003 | Levin |
| 2003/0167402 | A1 | 9/2003 | Stolfo et al. |
| 2003/0191966 | A1 | 10/2003 | Gleichauf |
| 2003/0212902 | A1 | 11/2003 | van der Made |
| 2003/0233352 | A1 | 12/2003 | Baker |
| 2003/0236995 | A1 | 12/2003 | Fretwell, Jr. |
| 2004/0015554 | A1 | 1/2004 | Wilson |
| 2004/0015712 | A1 | 1/2004 | Szor |
| 2004/0015726 | A1 | 1/2004 | Szor |
| 2004/0030913 | A1 | 2/2004 | Liang et al. |
| 2004/0039921 | A1 | 2/2004 | Chuang |
| 2004/0103310 | A1 | 5/2004 | Sobel et al. |
| 2004/0117401 | A1 | 6/2004 | Miyata et al. |
| 2004/0117641 | A1 | 6/2004 | Kennedy et al. |
| 2004/0158730 | A1 | 8/2004 | Sarkar |
| 2004/0162808 | A1 | 8/2004 | Margolus et al. |
| 2004/0181687 | A1 | 9/2004 | Nachenberg et al. |
| 2004/0220975 | A1 | 11/2004 | Carpentier et al. |
| 2005/0021740 | A1 | 1/2005 | Bar et al. |
| 2005/0044406 | A1 | 2/2005 | Stute |
| 2005/0132205 | A1 | 6/2005 | Palliyil et al. |
| 2005/0177736 | A1 | 8/2005 | De los Santos et al. |
| 2005/0204150 | A1 | 9/2005 | Peikari |
| 2006/0064755 | A1 | 3/2006 | Azadet et al. |

FOREIGN PATENT DOCUMENTS

| | | |
|---|---|---|
| EP | 0636977 A2 | 2/1995 |
| EP | 1 280 039 | 1/2003 |
| EP | 1408393 A2 | 4/2004 |
| GB | 2 364 142 A | 1/2002 |
| WO | WO 93/25024 A1 | 12/1993 |
| WO | WO 97/39399 A | 10/1997 |
| WO | WO 99/15966 A1 | 4/1999 |
| WO | WO 00/28420 A2 | 5/2000 |
| WO | WO 01/91403 A | 11/2001 |
| WO | WO 02/05072 A | 1/2002 |

WO    WO 02/33525 A2    4/2002

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Burchell, Jonathan, "NetShield 1.5", Virus Bulletin, Aug. 1994, pp. 21-23, XP 000617453.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36, Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

\* cited by examiner

PREVENTING UNAUTHORIZED LOADING OF LATE BINDING CODE INTO A PROCESS

TECHNICAL FIELD

This invention pertains generally to computer operating system internals, and more specifically to preventing unauthorized loading of late binding code into process address space.

BACKGROUND

It is important to protect software processes from having unknown late binding objects (e.g., dynamic link libraries) loaded into their address space. For example, various 32 bit versions of Microsoft Windows® such as Windows NT® include a registry key that lists dynamic link libraries (dll's) to load into a process's address space when the process is loaded into memory. In such versions of Windows®, user32.dll reads this registry key at process load time, and loads the dll's listed therein into the process's address space.

Although such functionality can be useful under some circumstances, it creates a security hole, as it allows unknown and hence possibly malicious dll's to be loaded into the address space of any process. What is needed are computer implemented methods, computer readable media and computer systems for preventing unauthorized loading of late binding code into a process. Because it can be desirable to load some late binding code (e.g., trusted dll's) into the a process's address space, computer implemented methods, computer readable media and computer systems that allow selective loading of permitted late binding code would be beneficial.

DISCLOSURE OF INVENTION

Computer-implemented methods, computer systems and computer-readable media enable the prevention of unauthorized loading of late binding code into a process. In one embodiment, a late binding code manager detects attempts to load late binding code into a process's address space. The late binding code manager determines whether detected attempts are permitted. Responsive to the results of a determination as to whether an attempt to load late binding code into a process's address space is permitted, the late binding code manager executes at least one additional step affecting the loading of the late binding code into the process's address space. Such a step can comprise permitting, blocking or modifying the attempt to load the late binding code.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
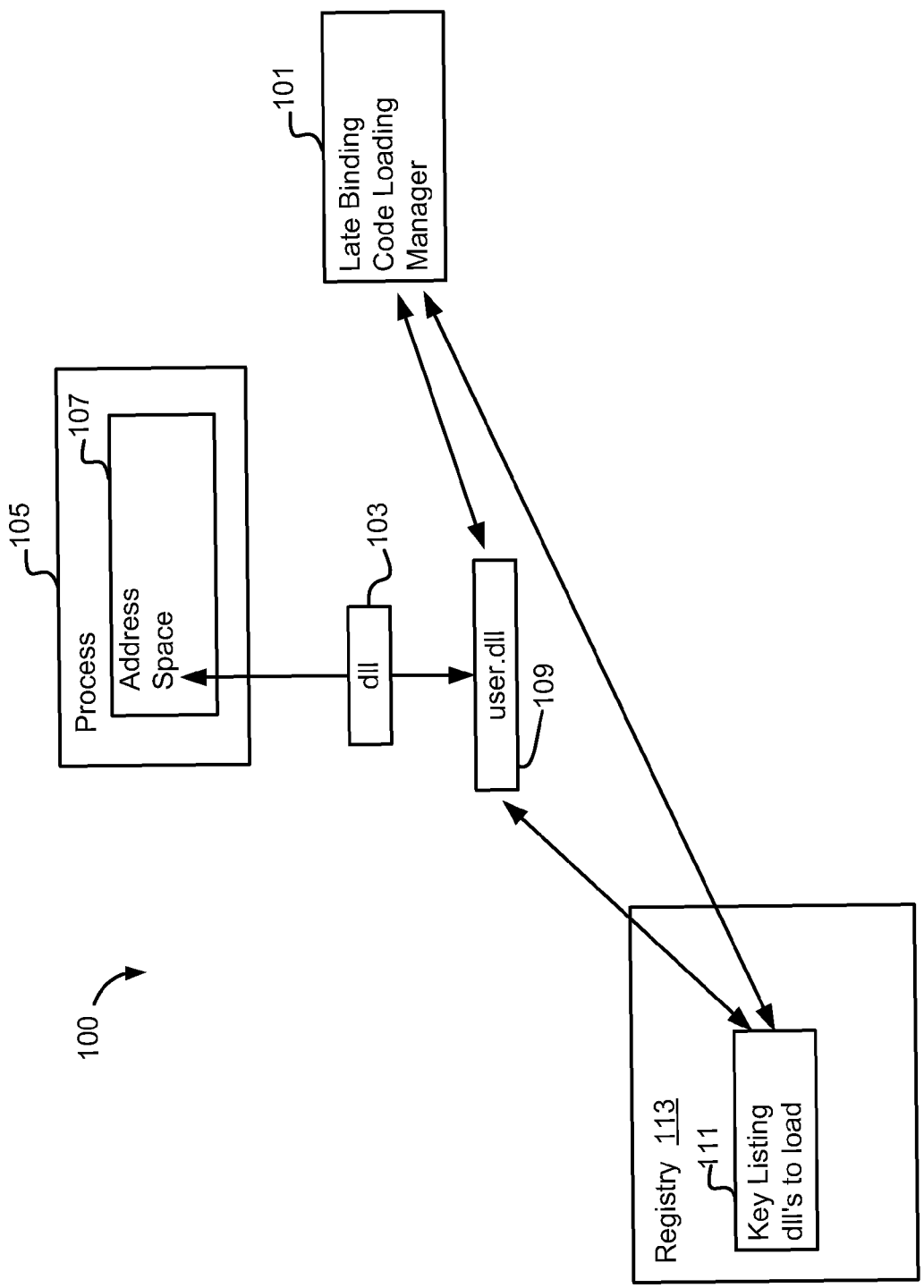
FIG. 1 is a block diagram illustrating a high level overview of a system for practicing some embodiments of the present invention.

FIG. 1 illustrates a high level overview of a system 100 for practicing some embodiments of the present invention. A late binding code manager 101 prevents unauthorized loading of late binding code 103. It is to be understood that although the late binding code manager 101 is illustrated as a single entity, as the term is used herein a late binding code manager 101 refers to a collection of functionalities which can be implemented as software, hardware, firmware or any combination of these. Where a late binding code manager 101 is implemented as software, it can be implemented as a standalone program, but can also be implemented in other ways, for example as part of a larger program, as a plurality of separate programs, as one or more device drivers or as one or more statically or dynamically linked libraries.

This specification describes performing some embodiments of the present invention within the context of a current Microsoft Windows NT® configuration (including versions of Windows based on NT, such as XP, 2000 and 2003). Thus, the names of system components and system functions used herein are those of the current version of Windows NT®. Of course, the present invention is not tied to Windows NT®, or to these names specifically, and in various embodiments of the present invention the described components can have other names as desired. For example, user32.dll 109 might have a different name in future or different versions of Windows, all of which would be within the scope of the present invention.

As illustrated in FIG. 1, the late binding code manager 101 detects an attempt to load late binding code 103 into a process's 105 address space 107. More specifically, in the example embodiment illustrated in FIG. 1, the late binding code manager 101 detects that user32.dll 109 is attempting to load late binding code 103 in the form of at least one dll 103 into a process's 105 address space 107 by accessing a specific key 111 in the registry 113 which lists the dll's 103 to insert into a process's 105 address space 107 at load time. As explained above, this feature of Windows® creates a security hole.

In the embodiment illustrated in FIG. 1, the late binding code manager 101 monitors access of the registry 113 key 111 to detect attempts to load late binding code 103 into a process's 105 address space 107. Upon detecting access of the registry 113 key 111 that enumerates late binding code 103 to load into a process's 105 address space 107, the late binding code manager 101 determines whether the attempt to load the late binding code 103 is permitted, as discussed in detail below. The implementation mechanics of monitoring access of the registry key 111 will be readily apparent to those of ordinary skill in the relevant art in light of this specification. For example, access to the key 111 can be monitored by wrapping and intercepting the system functions that access the registry, and watching for attempts to access the specific key 111 that is of interest.

In some embodiments, the late binding code manager 101 specifically monitors access by user32.dll 109 to the registry 113 key 111 that enumerates late binding code 103 to load into a process's 105 address space 107, as user32.dll 109 is the code that currently loads the dll's 103 listed in the key 111 at process 105 load time. In other embodiments, the late binding code manager 101 monitors access to the registry 113 key 111 by other programs, or all access thereto as desired.

In some embodiments of the invention, the late binding code manager 101 detects attempts to load late binding code 103 other than dll's 103 (e.g., .COM objects, etc.) into process 105 address space. Additionally, in some embodiments of the invention, the late binding code manager 101 detects attempts to load late binding code 103 into process 105 address space 107 in ways other than by monitoring access to a registry 113 key 111, for example in systems where a list of such late binding code 103 is stored elsewhere, such as a system table or other data structure.

Once the late binding code manager 101 detects and attempt to load late binding code 103 into process 105 address space 107, the late binding code manager 101 determines whether the attempt is permitted. In some embodiments, the late binding code manager 101 makes this determination simply on the basis of the process 105 which is the target of the late binding code 103 injection. In such embodiments, all attempts by any program to load late binding code 103 into any process 105 that is designated as being protected are not permitted. Which processes 105 to protect is a variable design parameter, configurable, for example, by a system administrator. In other embodiments, only attempts to load late binding code 103 into a protected process 105 by user32.dll 109 (or alternatively other specific system resource(s)) are forbidden.

In yet other embodiments, permission can be a function of the late binding code 103 which is the subject of the loading attempt. For example, the late binding code manager can examine the individual dll's 103 (or other type of late binding code 103 module) listed in the registry 113 key 111 (or listed elsewhere), and determine whether specific dll's 103 are permitted to be loaded into the address space 107 of protected (or specific protected) processes 105. For example, it can be permitted to load dll's 103 that are on a white list (or alternatively not on a black list), or not permitted to load dll's 103 that are on a black list (or not on a white list). Of course, other criteria are possible as well, for example whether the dll 103 is digitally signed and/or originates from a trusted source.

Responsive to the results of the determination as to whether the attempt to load late binding code 103 into the process's 105 address space 107 is permitted, the late binding code manager 101 executes at least one additional step affecting loading of late binding code 103 into the process's 105 address space 107.

Figure 2:
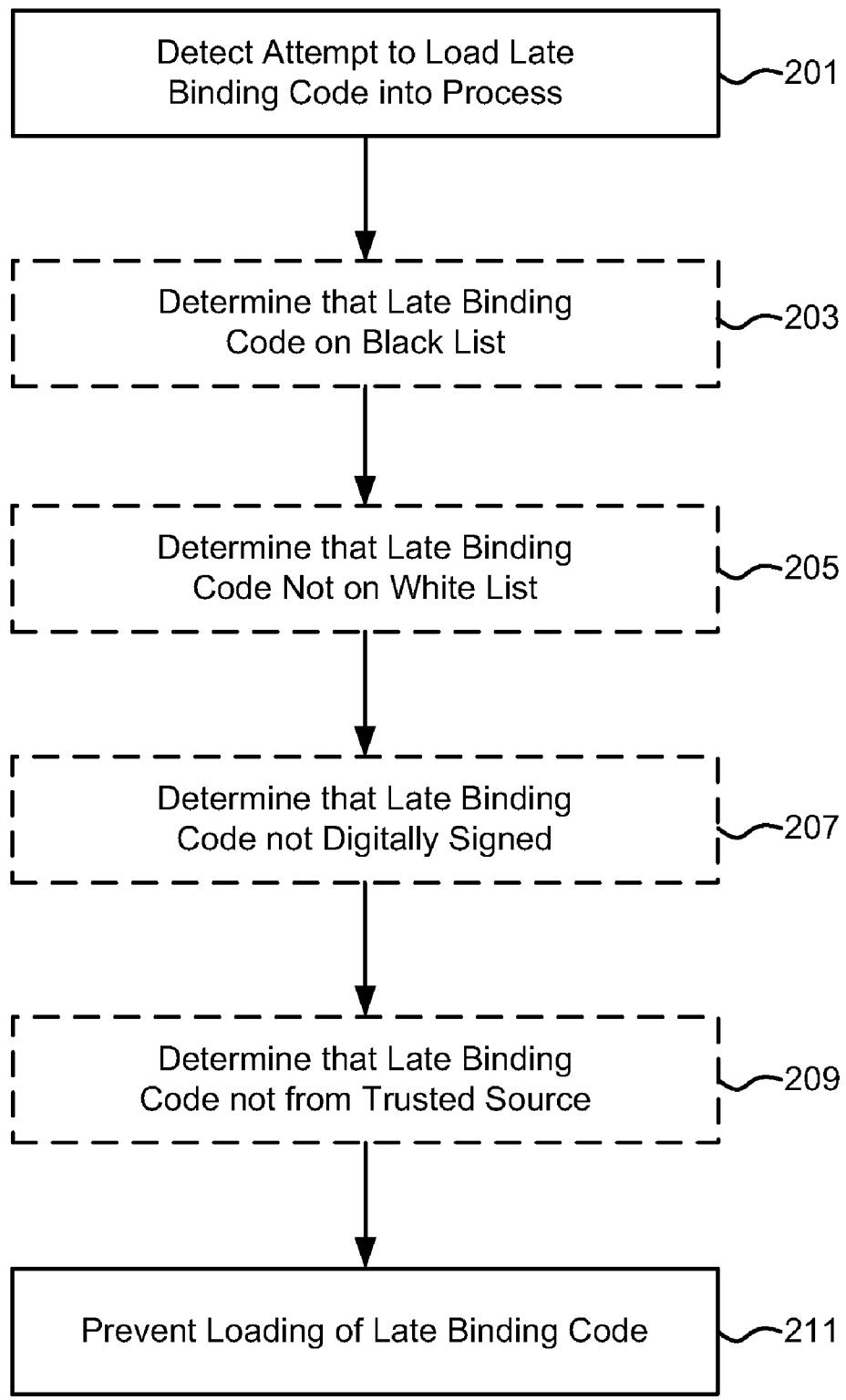
FIG. 2 is a flowchart illustrating steps for preventing the unauthorized loading of late binding code, according to some embodiments of the present invention.

Turning now to FIG. 2, steps are illustrated for determining that the attempt to load late binding code 103 is not permitted, and for responding to that determination, according to some embodiments of the present invention. The late binding code manager 101 detects 201 an attempt to load late binding code 103 (e.g., a list of dll's 103 enumerated in the registry 113 key 111 described above) into a process's 105 address space 107. In some embodiments, the late binding code manager 101 checks the dll's 103 to be loaded against a black list of prohibited dll's 103, and determines 203 that at least one of the dll's 103 to be loaded is on the black list. In some embodiments, the late binding code manager 101 prevents 211 the loading of the blacklisted dll's 103 and allows 309 the loading of dll's 103 listed in the registry 113 key 111 that are not on the black list. In other embodiments, if even one of the dll's 103 listed in the registry 113 key 111 is blacklisted, the late binding code manager 101 prevents 211 the loading of all dll's 103 into the process's 105 address space 107.

In some embodiments, the late binding code manager 101 checks the dll's 103 to be loaded against a white list of trusted dll's 103, and determines 205 that at least one of the dll's 103 to be loaded is not on the white list. In some embodiments, the late binding code manager 101 prevents 211 the loading of the dll's 103 that are not on the white list, and allows 309 the loading of dll's 103 listed in the registry 113 key 111 that are on the white list. In other embodiments, if even one of the dll's 103 listed in the registry 113 key 111 is not on the white list, the late binding code manager 101 prevents 211 the loading of all dll's 103 into the process's 105 address space 107.

In some embodiments, the late binding code manager 101 checks whether the dll's 103 to be loaded are digitally signed, and determines 207 that at least one of the dll's 103 to be loaded is not. In some embodiments, the late binding code manager 101 prevents 211 the loading of the dll's 103 that are not digitally signed, and allows 309 the loading of dll's 103 listed in the registry 113 key 111 that are digitally signed. In other embodiments, if even one of the dll's 103 listed in the registry 113 key 111 is not digitally signed, the late binding code manager 101 prevents 211 the loading of all dll's 103 into the process's 105 address space 107.

In some embodiments, the late binding code manager 101 checks whether the dll's 103 to be loaded originate from a trusted source, and determines 209 that at least one of the dll's 103 to be loaded does not. In some embodiments, the late binding code manager 101 prevents 211 the loading of the dll's 103 that do not originate from a trusted source, and allows 309 the loading of dll's 103 listed in the registry 113 key 111 that do. In other embodiments, if even one of the dll's 103 listed in the registry 113 key 111 does not originate from a trusted source, the late binding code manager 101 prevents 211 the loading of all dll's 103 into the process's 105 address space 107.

Figure 3:
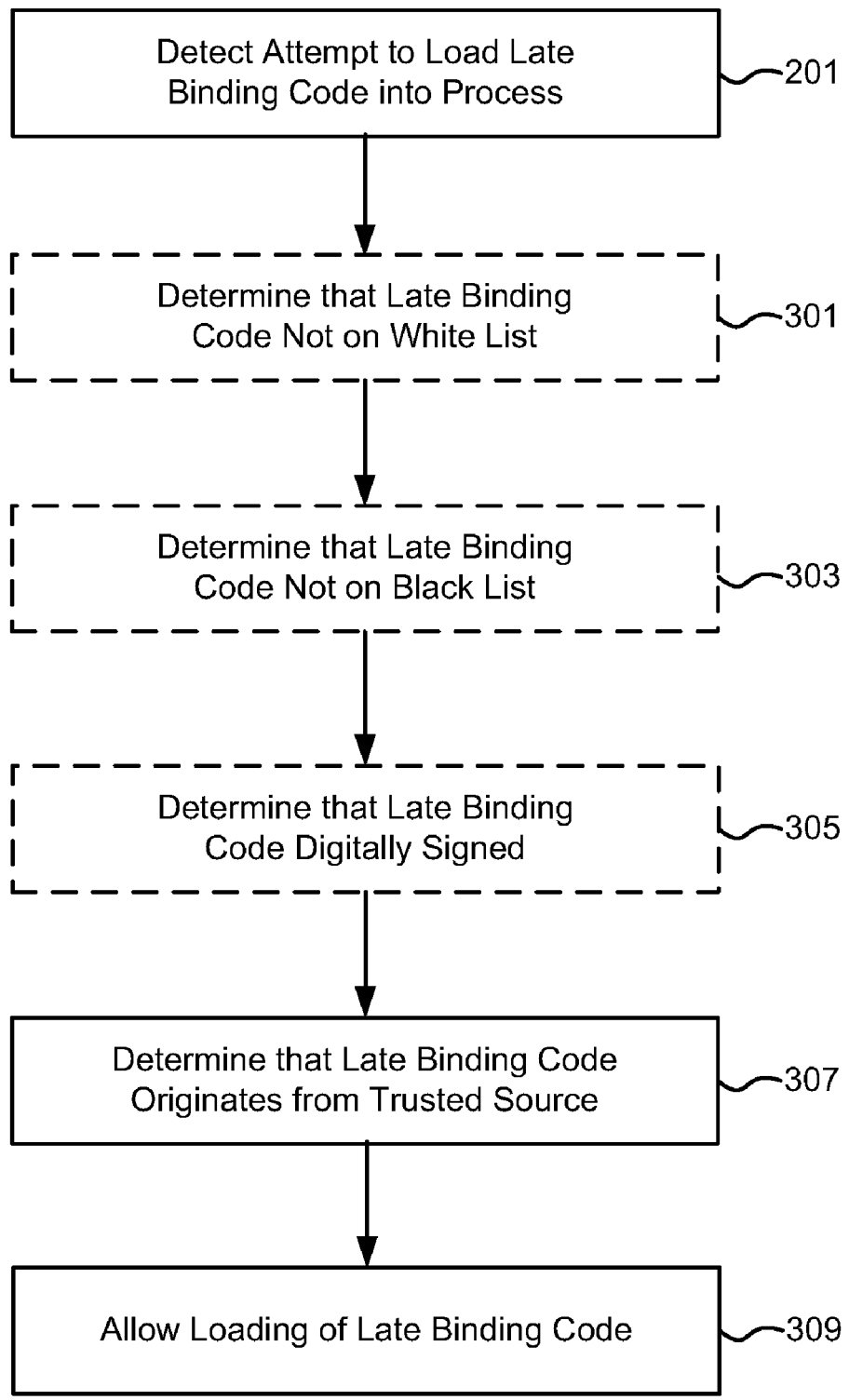
FIG. 3 is a flowchart illustrating steps for allowing the authorized loading of late binding code, according to some embodiments of the present invention.

FIG. 3 illustrates steps for determining that the attempt to load late binding code 103 is permitted, and for responding to that determination, according to some embodiments of the present invention. The late binding code manager 101 detects 201 an attempt to load late binding code 103 into a process's 105 address space 107. In some embodiments, the late binding code manager 101 checks the dll's 103 (or other late binding code modules 103) to be loaded against a white list of trusted dll's 103, and determines 301 that at least one of the dll's 103 to be loaded is on the white list. In some embodiments, the late binding code manager 101 allows 309 the loading of the white listed dll's 103 and prevents 211 the loading of dll's 103 listed in the registry 113 key 111 that are not on the white list. In other embodiments, if even one of the dll's 103 listed in the registry 113 key 111 is not on the white list, the late binding code manager 101 prevents 211 the loading of all dll's 103 into the process's 105 address space 107.

In some embodiments, the late binding code manager 101 checks the dll's 103 to be loaded against a black list of prohibited dll's 103, and determines 303 that at least one of the dll's 103 to be loaded is not on the black list. In some embodiments, the late binding code manager 101 allows 309 the loading of the dll's 103 that are not on the black list, and prevents 211 the loading of dll's 103 listed in the registry 113 key 111 that are on the black list. In other embodiments, if even one of the dll's 103 listed in the registry 113 key 111 is blacklisted, the late binding code manager 101 prevents 211 the loading of all dll's 103 into the process's 105 address space 107.

In some embodiments, the late binding code manager 101 checks whether the dll's 103 to be loaded are digitally signed, and determines 305 that at least one of the dll's 103 to be loaded is. In some embodiments, the late binding code manager 101 allows 309 the loading of all dll's 103 that are digitally signed, and prevents 211 the loading of dll's 103 listed in the registry 113 key 111 that are not digitally signed. In other embodiments, if even one of the dll's 103 listed in the registry 113 key 111 is not digitally signed, the late binding code manager 101 prevents 211 the loading of all dll's 103 into the process's 105 address space 107.

In some embodiments, the late binding code manager 101 checks whether the dll's 103 to be loaded originate from a trusted source, and determines 307 that at least one of the dll's 103 to be loaded does. In some embodiments, the late binding code manager 101 allows 309 the loading of all dll's 103 that do originate from a trusted source, and prevents 211 the loading of dll's 103 listed in the registry 113 key 111 that do not. In other embodiments, if even one of the dll's 103 listed in the registry 113 key 111 does not originate from a trusted source, the late binding code manager 101 prevents 211 the loading of all dll's 103 into the process's 105 address space 107.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for preventing unauthorized loading of late binding code into a process, said method comprising the steps of:
   detecting, by a late binding code manager executing on a computer, an attempt to load late binding code into a process's address space, the detecting comprising detecting access of a registry key that enumerates late binding code to load into the process's address space;
   determining, by the late binding code manager executing on the computer, whether the attempt to load late binding code into the process's address space is permitted; and
   responsive to determining that the attempt to load late binding code is not permitted, preventing, by the late binding code manager executing on the computer, at least some of the late binding code from being loaded into the process's address space.

2. The method of claim 1 further comprising:
   monitoring, by the late binding code manager executing on the computer, access of the registry key.

3. The method of claim 1 further comprising:
   detecting, by the late binding code manager executing on the computer, that a second process is accessing the registry key.

4. The method of claim 3 wherein:
   the process accessing the registry key houses user32.dll.

5. The method of claim 1 wherein determining whether the attempt to load late binding code is permitted further comprises:
   determining, by the late binding code manager executing on the computer, whether at least some late binding code which is a target of the detected attempt is on a white list.

6. The method of claim 1 wherein determining whether the attempt to load late binding code is permitted further comprises:
   determining, by the late binding code manager executing on the computer, whether at least some late binding code which is a target of the detected attempt is on a black list.

7. The method of claim 1 wherein determining whether the attempt to load late binding code is permitted further comprises:
   determining, by the late binding code manager executing on the computer, whether at least some late binding code which is a target of the detected attempt is digitally signed.

8. The method of claim 1 wherein determining whether the attempt to load late binding code is permitted further comprises:
   determining, by the late binding code manager executing on the computer, whether at least some late binding code which is a target of the detected attempt originates from a trusted source.

9. The method of claim 1 wherein determining that the attempt to load late binding code is not permitted comprises:
   determining, by the late binding code manager executing on the computer, that at least some of the late binding code meets at least one criteria from a group of criteria consisting of:
   being on a black list;
   not being on a white list;
   not being digitally signed; and
   not originating from a trusted source.

10. The method of claim 9 further comprising the late binding code manager executing on the computer performing at least one step from a group of steps consisting of:
   preventing late binding code that is on a black list from being loaded into the process's address space;
   preventing late binding code that is not on a white list from being loaded into the process's address space;
   preventing late binding code that is not digitally signed from being loaded into the process's address space; and
   preventing late binding code that does not originate from a trusted source from being loaded into the process's address space.

11. The method of claim 1 further comprising:
   responsive to determining that the attempt to load late binding code is permitted, the late binding code manager executing on the computer allowing at least some of the late binding code to be loaded into the process's address space.

12. The method of claim 11 wherein determining that the attempt to load late binding code is permitted further comprises:
   determining, by the late binding code manager executing on the computer, that at least some of the late binding code meets at least one criteria from a group of criteria consisting of:
   not being on a black list;
   being on a white list;
   being digitally signed; and
   originating from a trusted source.

13. The method of claim 12 further comprising the late binding code manager executing on the computer performing at least one step from a group of steps consisting of:
   allowing late binding code that is not on a black list to be loaded into the process's address space;
   allowing late binding code that is on a white list to be loaded into the process's address space;
   allowing late binding code that is digitally signed to be loaded into the process's address space;
   allowing late binding code that originates from a trusted source to be loaded into the process's address space.

14. The method of claim 1 wherein determining whether the attempt to load late binding code is permitted further comprises:
   determining, by the late binding code manager executing on the computer, whether the process into the address space of which the late binding code is being attempted to be loaded is protected.

15. A computer-readable storage medium storing computer-executable code for preventing unauthorized loading of late binding code into a process, the computer-executable code comprising instructions for performing the steps of:
   detecting an attempt to load late binding code into a process's address space, the detecting comprising detecting access of a registry key that enumerates late binding code to load into the process's address space;
   determining whether the attempt to load late binding code into the process's address space is permitted; and
   responsive to determining that the attempt to load late binding code is not permitted, preventing at least some of the late binding code from being loaded into the process's address space.

16. The computer program product of claim 15 wherein the computer-executable code further comprises instructions for performing the step of:
   responsive to determining that the attempt to load late binding code is permitted, allowing at least some of the late binding code to be loaded into the process's address space.

17. The computer program product of claim 15 wherein the computer-executable code further comprises instructions for performing the step of:
   detecting that a second process is accessing the registry key.

18. The computer program product of claim 15 wherein determining whether the attempt to load late binding code is permitted further comprises:
   determining whether at least some late binding code which is a target of the detected attempt is on a white list.

* * * * *